Patented July 5, 1932

1,865,953

UNITED STATES PATENT OFFICE

LEONHARD PINK, OF BERLIN, GERMANY, ASSIGNOR TO HERMANN MEFFERT, OF HAMBURG, GERMANY

QUININE PREPARATION

No Drawing. Application filed March 8, 1929, Serial No. 345,581, and in Germany January 4, 1927.

My invention refers to a remedy which is particularly useful in combating malaria, and to the method of preparing same.

As is well known the alkaloids quinine, cinchonine and quinidine are nowadays administered both as prophylactica and also subsequently as remedies against malaria. It is a well known fact that the use of quinine is frequently accompanied by the formation of eczemas, erythemes, urticaria and oedemas, fever and the like. Quinine is further known to cause also visual disturbances which finally result in an atrophy of the optic nerves, and disturbances of hearing. Physicians conversant with tropical diseases have found that lack of calcium compounds in the blood of the patients is the cause of these disturbances.

I have now found that all these secondary phenomena are altogether obviated, if the quinine is replaced by the new double-salt of quinine which forms the subject matter of the present invention. I have further found that by administering this double-salt to persons suffering from malaria the alkaloid itself is caused by the retention of calcium to remain longer in the blood than hitherto and that for this very reason smaller doses than hitherto administered have a far greater effect. The new salt of quinine has further been found to be soluble without the addition of an acid, in contradistinction to sulfuric or hydrochloric quinine which are soluble only if an acid is added.

I have further ascertained that the small doses of the new remedy, which are required, if compressed to form very small tablets, can be swallowed like pills and, if tartaric acid or citric acid are added together with sodium bicarbonate, will dissolve only in the contents of the stomach so that the odious bitter taste of quinine is altogether removed.

The new double-salt is obtained for instance by stirring 20 parts by weight of quinine sulfate in 200 parts of water and adding dilute sulfuric or hydrochloric acid, until a liquid solution is obtained, to which is now added ammonia liquor, until the whole of the quinine in the form of the ammonium salt has separated out. This salt is now well rinsed on the suction filter, until no reaction is obtained in the filtrate on the addition of a soluble baryta salt or silver nitrate. The pure alkaloid salt is now stirred with water and pure lactic acid is added until a limpid solution of quinine lactate is formed. To this solution are added 20 parts calcium lactate and 2 parts sodium citrate in solution. After filtration the filtrate is evaporated on the water bath until the double-salt separates out in the form of crystals. The mother liquor together with these crystals is now allowed to stand in the cold, whereupon the double-salt crystallizes out together with the sodium citrate. The presence of this latter salt is not only harmless but useful inasmuch as it is decomposed physiologically in the blood to form sodium carbonate, which renders the blood alkaline.

The product thus obtained is a double-salt of quinine calcium lactate and sodium citrate. The quinine calcium lactate has the form of white crystal needles.

The double-salt is believed to be constituted according to the formula

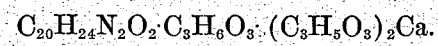
$$C_{20}H_{24}N_2O_2 \cdot C_3H_6O_3 \cdot (C_3H_5O_3)_2Ca.$$

While quinine sulfate dissolves only in 800 parts, quinine hydrochloride in 32 parts and quinine lactate in 10–20 parts water, the new double salt dissolves already in 5 parts water. It is absolutely neutral and has a decided retarding effect, as compared for instance with quinine hydrochloride. While 1 gram of this latter salt can be traced in human urine already after 30 minutes, the strongest reaction taking place after one hour and the quinine having substantially disappeared again after two hours, upon the corresponding quantity of the new double salt being administered, the first traces will show only after 1½–2 hours, while the strongest reaction obtains after 3 hours and the quinine has not disappeared altogether after the lapse of 5 to 7 hours. In consequence of this slower action of the new double salt the calcium-quinine compound remains longer in the body and can act longer on the blood so that smaller quantities of quinine will suffice to obtain the same effect. In view of the undesirable action of quinine mentioned above the possibility of reducing the doses of quinine administered to the patients involves an important advance.

Various changes may be made in the details disclosed in the foregoing specification without departing from the invention or sacrificing the advantages thereof.

I claim:

1. As a new product, a double salt of quinine lactate and calcium lactate having the formula $$C_{20}H_{24}N_2O_2 \cdot C_3H_6O_3 \cdot (C_3H_5O_3)_2Ca$$

being soluble without the addition of acids and having a therapeutical action on malaria.

2. The method of making a quinine preparation comprising preparing a watery suspension of quinine sulfate, adding a mineral acid to obtain solution, neutralizing with ammonia to precipitate the quinine salt, separating this salt, rinsing and dissolving same in lactic acid to form quinine lactate, adding calcium lactate to convert all of the quinine lactate into the double salt defined in claim 1 and causing crystallization of this double salt.

In testimony wherof I affix my signature.

LEONHARD PINK.